Patented Jan. 30, 1940

2,188,884

UNITED STATES PATENT OFFICE 2,188,884

COATING COMPOSITION AND METHOD

Edwin T. Clocker, Bethlehem, Pa.

No Drawing. Application September 27, 1937, Serial No. 165,900

21 Claims. (Cl. 91—68)

This invention relates to methods of coating and to coating compositions.

This application is a continuation in part of my copending applications, Serial No. 759,086, filed December 24, 1934, and Serial No. 117,243, filed December 22, 1936, both for Condensation product and method. Serial No. 759,086 includes the generic claims and certain species relating to the condensation of an acyclic olefinic acid or ester having less than ten carbon atoms in the carbon chain, with a nonconjugated unsaturated nonhydroxylated aliphatic acid having from ten to twenty-four carbon atoms in the carbon chain, or a salt or ester thereof. Serial No. 117,243 relates particularly to the preparation of the maleic condensation product. Serial No. 165,899, filed Sept. 27, 1937, for Condensation product and method, includes the subject matter relating to recondensation. Serial No. 165,898, filed Sept. 27, 1937, for Condensation product and method, is concerned particularly with salts of the condensation product, useful for example as dispersing agents.

Serial No. 231,759, filed September 26, 1938, for Condensation product and method is directed to the reaction product of the condensation product with a basic dyestuff. Serial No. 231,760, filed September 26, 1938, for Condensation product and method is directed to water-insoluble metallic salts. Serial No. 231,761, filed September 26, 1938, for Oily dispersion material covers oils, fats and waxes emulsified by the condensation product of the invention. Serial No. 235,252, filed October 15, 1938, for Condensation product and method is directed to condensation with oleic acid or its compounds.

A purpose of the invention is to produce coatings and especially metallic coatings from the condensation product obtained between an acyclic olefinic acid having less than ten carbon atoms in its carbon chain, and one of the group consisting of nonconjugated unsaturated nonhydroxylated aliphatic acids having from ten to twenty-four carbon atoms in their carbon chains, nonhydroxylated salts thereof and nonhydroxylated esters thereof or similar compounds, as explained below. Any relatively short chain acidic compound containing the ethylene linkage in condensable form may be condensed with any nonconjugated unsaturated nonhydroxylated aliphatic acid or the like having from ten to twenty-four carbon atoms in its carbon chain.

A further purpose is to produce an air-drying or thermo-hardening coating which gives improved adherence to metals and other substances by combining an acyclic olefinic acid having less than ten carbon atoms in its carbon chain with a nonconjugated unsaturated nonhydroxylated drying oil or the like, so that the effect of the acid in combining with the substance is available to produce good adherence.

A further purpose is to use a condensation product of an acyclic olefinic acid having less than ten carbon atoms in its carbon chain and a nonconjugated unsaturated nonhydroxylated fatty oil or the like having from ten to twenty-four carbon atoms in its carbon chain as a base or priming coat for the cellulose derivative lacquer, particularly when applied to metal, so as to gain improved adherence between the base coat and the cellulose derivative because of the mutual solubility of the condensation product and the cellulose derivative, and, because of the ability of the condensation product to act on the metal, to obtain good adherence to the metal or other substance being coated.

A further purpose is to manufacture lacquer or the like from a mixture of a cellulose derivative and my novel condensation product, for example using the maleic anhydride condensation product of linseed oil and an ethyl alcohol-ethyl acetate solution of nitrocellulose.

A further purpose is to produce a lacquer or the like by incorporating a cellulose derivative into my novel condensation product, for example desirably adding cellulose acetate or ethyl cellulose (in the case of ethyl cellulose, a reaction is obtained with elimination of water where the acidic group is present in the condensation product).

A further purpose is to obtain better leveling properties in the coating, improve the mixing of pigment in the vehicle, facilitate grinding of the pigment and secure controlled penetration of the non-volatile liquid portion of the paint by employing a condensation product of an acyclic olefinic acid having less than ten carbon atoms in its carbon chain and a nonconjugated unsaturated nonhydroxylated fatty oil having from ten to twenty-four carbon atoms in its carbon chain.

A further purpose is to "body" the condensation product of an acyclic olefinic acid, having less than ten carbon atoms in the carbon chain, and a nonconjugated unsaturated nonhydroxylated drying oil such as linseed oil, for the purpose of increasing the viscosity, by blowing and/or heating the condensation product, in the presence or absence of a drier.

A further purpose is to produce condensation between a condensable ethylene type acidic compound having less than ten carbon atoms in its carbon chain and the carbon chain of a nonconjugated unsaturated nonhydroxylated fatty acid or the like by suitable application of heat and, desirably, also, pressure. A temperature of between 150° C. and 300° C. or higher is employed for the reaction, 180° C. to 260° C. being the most satisfactory range. Desirably, the reaction will be carried out at a temperature in excess of the ordinary boiling point of the acyclic olefinic acid with return condensation.

A further purpose is to partially or completely saturate the double bonds of the nonconjugated unsaturated nonhydroxylated fatty acid, fatty oil, or the like in the condensation, and desirably to react one molecular equivalent of the condensable ethylene type acidic compound with one molecular equivalent of the nonconjugated unsaturated nonhydroxylated carbon chain compound.

A further purpose is to condense maleic anhydride or the like with a drying oil such as linseed oil and to employ the condensation product as a coating, preferably a base coat for metal.

A further purpose is to produce oil-soluble driers by causing a metal or a metallic compound to combine with the acid portion of a condensation product produced from an acylic olefinic acid having less than ten carbon atoms in its carbon chain and a nonconjugated unsaturated nonhydroxylated fatty acid or the like having from ten to twenty-four carbon atoms in its carbon chain.

A further purpose is to produce a drier directly in the nonvolatile liquid ingredient of the paint by combining a suitable metallic compound with certain of the polar-reactive groups in my novel condensation product.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957 disclose a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and acids and similar compounds having from ten to twenty-four carbon atoms in the carbon chain and the condensation product thus obtained will form very desirable coatings.

To produce the maleic condensation product, the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under which maleic anhydride is produced. The production of maleic anydride from such other acids is well known in the art (Bernthsen, Textbook of Organic Chemistry (1923) pages 250-256). Instead of maleic anhydride, an acid ester of maleic acid, or a substituted maleic acid having less than ten carbon atoms in its carbon chain may be used.

As explained herein, in order to avoid a mere esterification of alcohol groups, as distinguished from a condensation of the double bond, the oil or similar compound should be nonhydroxylated. Where necessary, precautions should be used to avoid hydroxylation by hydrolysis or otherwise. As well known in the art, in order to prevent or minimize hydrolysis, the reacting components should be reasonably dry, and water formed by decomposition of a reacting ingredient during the reaction should be removed. For example, if maleic acid (as distinguished from the anhydride) is caused to react with an oil or similar compound, it is preferable to use a relatively high temperature to cause rapid reaction, and it is preferable to permit elimination of the water formed by decomposition of the maleic acid into maleic anhydride, as by permitting distillation and avoiding refluxing. Where maleic anhydride or a similar compound not producing water by decomposition is to be used, the desirability of avoiding refluxing of course ceases.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Wherever I refer herein to an acid or to an acid group, I of course include an acid anhydride and an acid anhydride group, and vice versa, as well as a half ester of an acid. Wherever I refer to an ester, I include also a half ester.

Investigation of a large number of compounds has shown that condensation with a nonconjugated unsaturated nonhydroxylated aliphatic acid having from ten to twenty-four carbon atoms in the carbon chain is generally characteristic of chain compounds having the ethylene linkage and having less than ten carbon atoms in the carbon chains, which are substituted on one or both sides of the double bond to form acids or acid anhydrides, or half esters thereof, or similar compounds. These compounds are olefinic as they are acyclic and have the ethylene linkage. Such olefinic compounds are mono-substituted when they contain only one acid, acid anhydride or esterified group; for example crotonic acid. Such olefinic compounds are di-substituted when they contain two alcohol, aldehyde, acid, acid anhydride or esterified groups; for example maleic anhydride, citraconic anhydride, maleic acid, acid methyl maleate.

The longer the carbon chain of the acyclic olefinic acid or acid anhydride, or half ester thereof, or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of any ester of any olefinic compound, the carbon chain of the olefinic compound should have less than ten carbon atoms, the carbon chain of the compound added by esterification not being counted.

In all cases where I refer in the specification to less than ten carbon atoms in the carbon chain of the olefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

It will of course be apparent that an attempt to condense maleic anhydride or the like with a nonconjugated unsaturated hydroxylated aliphatic acid having from ten to twenty-four carbon atoms in the carbon chain, or a salt or ester thereof, will result in esterification between the acidic group of maleic anhydride and the hydroxyl group or groups in the aliphatic acid, salt or ester. Condensation between the maleic anhydride or the like and the carbon chain of the hydroxylated aliphatic acid, salt, or ester, will only take place after esterification is complete, and in case maleic anhydride or the like in excess of that consumed by the esterification is present in contact with the esterified hydroxylated aliphatic acid, salt or ester under the proper conditions.

The esterification of course produces a change in properties, and the condensation product of a hydroxylated aliphatic acid, salt or ester can in general be given properties comparable with those of the condensation product of a nonhydroxylated aliphatic acid, salt, or ester, only by destroying the esterification of the maleic anhydride or the like, as by hydrolysis.

Due to the difficulty in obtaining a condensation reaction between maleic anhydride or the like and a nonconjugated unsaturated hydroxylated aliphatic acid having from ten to twenty-four carbon atoms in the carbon chain, due to the change in properties caused by esterification, and due to the difficulty of decomposing the ester, the claims have generally been drawn to exclude hydroxylated aliphatic acids, salts and esters. This means that such acids, salts and esters are not sufficiently hydroxylated to interfere with the condensation by esterification. Oils which are polymerized by blowing with air are usually hydroxylated.

In those cases where the claims do not exclude hydroxylated aliphatic acids, salts and esters, it will be understood that more than mere esterification is intended—there should be condensation at a point of unsaturation on the carbon chain of the acid, salt or ester.

When reference is made to the maleic grouping in condensable form, it will be understood that it is intended to designate maleic anhydride, a substance yielding maleic anhydride or an acid maleic ester or similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound having the maleic grouping, preferably maleic anhydride.

As will be later explained in considerable detail, the presence of the acid or acid anhydride radical in the condensation product is distinctly advantageous, because of the reactions of which the acid or acid anhydride radical is capable and the uses to which such reactions may be put.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acids may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linolic, linoleic, clupanodonic and undecylenic. The esters of the nonhydroxylated fatty acids may be either glyceryl esters, which form oils such as corn, olive, cotton seed, peanut, linseed, sunflower, safflower, perilla, hemp seed, walnut seed, soya bean, rape seed, tomato seed, neat's-foot, lard, codliver, cod, burbet, salmon, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, may be employed if desired.

When I refer to the grouping of a nonconjugated unsaturated nonhydroxylated aliphatic acid having from ten to twenty-four carbon atoms in the carbon chain, I mean to include the acid, and compounds of the acid such as esters of the acid, whether with mono-, di- or poly-hydric-alcohols, and salts of the acid. I do not include herein hydroxylated aliphatic acids, oils, etc., because, while the condensation of my invention may in certain cases be obtained with them, special precautions must be taken because of the tendency of hydroxylated fatty acids, oils, etc., to esterify and gel. Typical hydroxylated fatty oils are castor oil and cashew nut shell oil. The question of whether the free acid or the ester or the salt is used is immaterial from the standpoint of the condensation reaction because the condensation reaction with the maleic anhydride appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I may desirably employ one molecular equivalent of nonconjugated unsaturated nonhydroxylated acid or the like to one molecular equivalent of acyclic olefinic acid and subject the mixture to a temperature of between 150° C. and 300° C. (more desirably between 180° C. and 260° C.) and preferably also to high pressure to facilitate the reaction. The temperature may in some cases be somewhat above 300° C. if the reacting components can stand such high temperature. Pressure may desirably be applied by simply confining the reaction components between the walls of some vessel such as a pressure autoclave and then heating the reaction components. Pressure may also be applied in any other suitable way, as by pumping the reaction components into the vessel or introducing an inert gas under pressure. I have used pressures up to 300 pounds per square inch with success. Of course the desirable pressure will vary with the individual reaction.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient acyclic olefinic acid, having less than ten carbon atoms in the carbon chain, to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil, one-third of the double bonds (one) is ordinarily saturated, and in linseed oil one-sixth (one). But in individual cases it may be desirable to satisfy more ethylene linkages in the fatty acid or fatty oil, and even to completely saturate them. To saturate all of the ethylene linkages in linseed oil, six molecular equivalents of olefinic compound having less than ten carbon atoms in the carbon chain are caused to react with one molecular equivalent of linseed oil.

Examples 1 to 5 given below, clearly indicate the way in which my improved condensation product is obtained:

Example 1

In a pressure autoclave, 180 parts by weight of raw alkali-refined linseed oil are mixed with 20 parts by weight of maleic anhydride. The temperature is maintained at from 230° C. to 260° C. for one hour, a pressure of about 30 pounds per square inch developing. The reaction may be obtained satisfactorily at 150° C., but is much slower at this low temperature, and the temperature may be raised to as much as 300° C. or even somewhat higher, but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of cellulose derivatives such as nitrocellulose in all proportions. The iodine value is 141.4, as against 190.0 for the original linseed oil. The saponification value is 288 and the acid value is 52.9, in the presence of ethyl alcohol.

Example 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of maleic anhydride condensed under the reflux progressively diminishes. The temperature is maintained at 250° C. to 260° C. until no more maleic anhydride appears to condense. The temperatures given are those found best for carrying out the reaction, although temperatures between 150° C. and 300° C., or even somewhat higher, may be used.

The condensation product is soluble in ethyl alcohol, ether, xylene, carbon tetrachloride and solutions of cellulose derivatives such as nitrocellulose, but is substantially insoluble in petroleum hydrocarbons and fatty oils.

Example 3

To 180 parts by weight of linseed oil are added 25 parts by weight of citraconic anhydride (a substituted maleic anhydride) and the mixture is heated in a three-neck flask, equipped with a reflux condenser, at about 250° C. for about three-quarters of an hour. At the end of this period, no further citraconic anhydride appears to condense, indicating completion of the reaction. As a precaution, heating is continued for about 15 minutes longer. The reaction product is less viscous than the maleic condensation product of linseed oil obtained in Example 1, but has the same properties otherwise.

Example 4

A mixture of 25 parts by weight of linseed oil and 2.4 parts by weight of crotonic acid (an olefinic acid) are heated under pressure at about 250° C. for about two hours. The condensation product has similar properties to the maleic-linseed oil condensation product obtained in Example 1 as respects solubility above noted, and drying action and adherence to metals, noted below.

Example 5

A mixture of 900 parts by weight of linseed oil and 112 parts by weight of acid methyl maleate (a maleic half ester) are heated under pressure at about 250° C. for about two hours. The reaction product is a drying oil exhibiting preferential adherence to metal and other materials as later explained.

My novel condensation product may be made with nonconjugated unsaturated nonhydroxylated drying, semidrying or nondrying fatty oils having from ten to twenty-four carbon atoms in the carbon chain, or mixtures of the same, and the characteristics of the product are, to some extent, dependent upon the character of the oils or the like employed in the reaction. For convenience, the group of semidrying oils is classed with the group of drying oils in the claims, so that a claim for a drying oil will include a semi-drying oil. When nonconjugated unsaturated nonhydroxylated drying oils are caused to react with maleic anhydride or the like, the products dry in the air at ordinary temperatures to form hard dry films whether or not driers are used. Likewise, the condensation products of nonconjugated unsaturated nonhydroxylated drying oils generally exhibit thermo-hardening properties, being convertible at 70° C. to 80° C., for example, into hard resistant varnish-like films in short periods of time. Where nonconjugated unsaturated nonhydroxylated semidrying oils such as sunflower, soya, safflower, and other similar oils are caused to react with maleic anhydride or the like, the condensation products do not dry so readily as the condensation products obtained from the drying oils. An example of the drying behavior of the condensation product obtained by Example 1 is as follows:

Example 6

A 1:1 xylene solution of the reaction product obtained in Example 1 to which soluble driers are added to the extent of 0.03% of cobalt, 0.05% of manganese and 0.5% of lead, for example in the form of linoleates or resinates, dries to a hard film at room temperature in about five hours and may be stoved to a hard film at 80° C. in about one and one-half hours. The film produced is not acted upon by water, ethyl alcohol, benzine, or xylene.

It is thus evident that the invention permits of the direct production of thermo-hardening and air-drying lacquers, paints, varnishes, etc.

Without limiting myself to any exact structure for the condensation product, it would appear that the condensation product is an addition product at a double bond in the carbon chain of the nonconjugated unsaturated nonhydroxylated fatty acid or the like to the condensable olefinic compound or the like. For example, if linolenic acid reacts with maleic anhydride, the first stage in the reaction appears to be in general as follows. Of course if enough maleic anhydride be present, the same reaction will take place at each double bond in the linolenic acid.

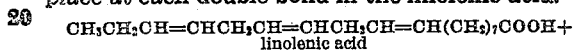
linolenic acid

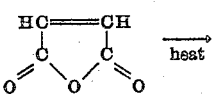 heat maleic anhydride

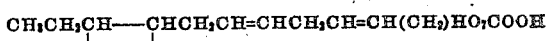

Maleic condensation product of linolenic acid

The iodine value of the condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appear to have disappeared in the condensation product forming a ring type compound with four carbon atoms in the ring.

The condensation product appears to be characterized by the linkage:

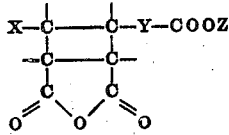

where X and Y are carbon chains without conjugated double bonds and Z is a hydrogen atom, a metal or an ester group.

The reaction above will be modified in well known manner if a glyceryl ester of linolenic acid instead of linolenic acid be used, or if some other nonconjugated unsaturated nonhydroxylated aliphatic acid having between ten and twenty-four carbon atoms in the carbon chain be employed or if some other acyclic olefinic acid or acid anhydride, or half ester, having less than ten carbon atoms in its carbon chain, be used instead of or in mixture with maleic anhydride.

It should be noted that the acyclic olefinic acid or acid anhydride condensation product of linolenic acid or any similar acid has a carboxyl group capable of reacting at the end of the linolenic or other similar carbon chain, and also an olefinic acid group capable of reacting. The condensation will take place notwithstanding that both of these groups have been esterified before the condensation reaction, but the presence of the unesterified polar-reactive groups is of great advantage for many purposes as later explained.

When maleic acid or a substance yielding maleic acid is condensed with a nonconjugated unsaturated nonhydroxylated fatty acid or the like, it appears to change to maleic anhydride and the maleic anhydride condensation product results.

Coatings

The condensation product of the present invention, and particularly the condensation product of an olefinic acid having less than ten carbon atoms in its carbon chain with a nonconjugated unsaturated nonhydroxylated drying oil, as prepared for instance according to Example 1, has very desirable properties for metallic coatings and especially for priming coats on metal. This material also is very desirable for coating on wood and other similar materials.

In many instances the condensation product of the present invention will comprise the entire paint, varnish or lacquer applied as a priming coat. In other words, no pigment and no thinner and in some cases even no drier need be used. In many instances, however, the condensation product of the present invention will form the nonvolatile part of the vehicle, or an ingredient of the non-volatile part of the vehicle, in a paint containing pigment. Some of the special advantages of the product of the present invention for coating purposes are as follows:—

Leveling

The paint produced by the use of the condensation product of the present invention as the vehicle or as an ingredient of the vehicle (for example 3% of the non-volatile vehicle) has superior leveling properties. These are so marked that where two paints are compared in use, identical except that one contains 3% of the condensation product of Example 1, it might be supposed by uninformed persons that the paint containing the condensation product was really enamel rather than paint because of the great smoothness and the removal of brush marks caused by the condensation product. The leveling property would appear to be due to the dispersing action of the condensation product. The surfaces exhibiting superior leveling have increased wearing properties by virtue of this fact.

Hardness

When the condensation product as obtained in Example 1 dries in a film, the film has been found to have a hardness greater than the film produced under similar conditions using raw linseed oil. A small amount, for instance 1% to 3%, of the condensation product obtained in Example 1, added to the raw linseed oil, greatly increases the resistance of the resultant film to accelerated weathering tests. The paint whose vehicle contains 3% of the condensation product above referred to shows less pitting and chipping than a paint which is exactly similar except for the absence of the condensation product.

Water resistance

A thoroughly dried film of the condensation product obtained in Example 1 has been found to have a far superior resistance both to cold and boiling water than a similar film of the drying oil from which the condensation product was made, for instance linseed oil.

If a dry film of raw linseed oil is placed in distilled water at room temperature, a foggy appearance develops on the surface within about forty-eight hours. A dry film of the condensation product exposed to distilled water under similar conditions shows no fogging after one week of exposure.

When subjected to boiling water, the dry film of raw linseed oil applied to a glass plate comes off within a few seconds while the dry film of the condensation product of Example 1 applied to glass under similar conditions resists for about two minutes before it peels off.

Wettability

The mixing of pigment with vehicles can be greatly facilitated by virtue of the superior wettability of the condensation product of the present invention for pigment. The condensation product obtained in Example 1, for instance, has a preferential adhesion to pigment. This may be employed by mixing a small quantity (say 1% or 3% based on the total weight of vehicle), of the condensation product of Example 1 with the pigment and then adding the remainder of the vehicle which may simply be raw linseed oil. The initial addition of the condensation product coats the pigment and when the raw linseed oil is subsequently added the mixing with the raw linseed oil is very readily accomplished. Superior mixing is also obtained even though the condensation product and the raw linseed oil are mixed together before being incorporated with the pigment. The time required for mixing with a pigment, such as zinc oxide, is very much reduced. It is much easier to grind the pigment with the vehicle if a few percent of the condensation product of the present invention are included in the vehicle or preferably are added to the pigment before mixing with the main body of the vehicle.

Settling

The condensation product of the present invention increases the permanence of suspension of pigment in a vehicle. As little as 3% of the condensation product of Example 1 incorporated in an ordinary linseed oil vehicle gave the following improvements in settling:—

| Pigment | Using 3% condensation product of Example 1 and 97% raw linseed oil in vehicle | Using 100% raw linseed oil in vehicle |
|---|---|---|
| White lead | 6 | 9+ |
| Zinc oxide | 3+ | 9+ |
| Titanox | 1 | 1+ |
| Lithopone | 1 | 1+ |

In the above scale 1 indicates no settling and 10 indicates maximum settling. With white lead pigment, the settling tendency was improved by 3% of the condensation product from 9+ to 6, while with zinc oxide the improvement was from 9+ to 3+. Even in lithopone and titanox paints, which have very little tendency to settle, an improvement was noted. The decrease in settling tendency, due to the condensation product as obtained in Example 1, or other condensation product of the present invention, constitutes a marked improvement from the standpoint of packaging paint and also in obtaining an even mixing of the paint by the user after opening the can.

Superpigmented paint

A very beneficial effect of the condensation product is that it makes possible exceptional increases in the pigment contents of paints. Whereas ordinary commercial paint commonly has a pigment content of about 28% to 30%, it is possible to obtain a pigment content of 40% without difficulty, by using the condensation product of the present invention (Example 1) for instance) as the vehicle or as an ingredient of the vehicle. A very desirable vehicle for such superpigmented paints may contain 15% of the condensation product of Example 1 with the remainder raw linseed oil. Such superpigmented paint may be applied with a brush with the usual quantity of thinner and flows without difficulty. The superpigmented paints produced as just explained have film strengths two or three times the film strengths of paints which have the ordinary quantities of pigments. The superpigmented paints are also markedly less responsive to ultra violet light. The films of such superpigmented paints are denser and of increased hiding power. Superpigmenting is advantageous in printing inks as well as in paints.

Controlled penetration

The condensation product of maleic anhydride or the like with a drying oil as made for instance in Example 1 has controlled penetration properties. Expressed in other words, when a film containing said condensation product is painted in the ordinary manner as the priming coat on wood or other permeable material, the vehicle will not leave the pigment but will penetrate only a few cells deep into the wood. In the ordinary paint using raw linseed oil alone as a vehicle, the vehicle will penetrate far into the wood leaving the pigment at the surface with a depleted vehicle content or without any vehicle. This is a frequent cause of failure of paint films. The reason for the controlled penetration of the condensation product of the present invention would appear to be preferential adhesion to the pigment. The conventional test for controlled penetration is painting an unglazed blotter and observing whether the paint penetrates to the other side. In case the condensation product of the present invention is used as the vehicle, it is found that the vehicle remains with the pigment on the side painted, while linseed oil will leave the pigment and soak into the blotter, being observable on the other side. This feature has contributed to the successful test of the condensation product of the present invention as a priming coat.

The polar-reactive quality of the acidic group in the olefinic acid having less than ten carbon atoms in its carbon chain is of great advantage when the condensation product with a nonconjugated unsaturated nonhydroxylated fatty oil having from ten to twenty-four carbon atoms in its carbon chain is used as a metallic coating. In this instance the acid group acts upon the metal which is coated and produces very tenacious adherence of the film. This gives to the condensation product very desirable properties for a base or priming coat.

Example 7

To 10 parts by weight of the viscous oil obtained by the interaction of linseed oil and maleic anhydride as described for instance in Example 1, soluble driers are added to the extent of about 0.03% cobalt, 0.05% manganese, and 0.5% lead in the form of linoleates or resinates. One half of a polished zinc plate is coated with a 1:1 xylene solution of the product just described and the film is stoved at 80° C. for one and one-half hours.

The film adheres very tenaciously to the metallic surface, and, if the film is removed by boiling acetone, the surface to which the film was attached shows a decided etching effect while the surface of the zinc which was not coated is unaffected. The etching effect appears to be due to the action of the acid anhydride radical in the maleic condensation product of linseed oil on the zinc.

The property of firm adherence to metal surfaces is exhibited with all of the ordinary structural and coating metals, such as zinc, tin, lead, copper, iron, aluminum, chromium, nickel, cadmium, etc. and their various alloys, such as steel nichrome, brass, bronze, zinc die-cast metal, etc. The maleic anhydride condensation product of linseed oil dries much more quickly on copper than linseed oil, probably because the copper salt of the condensation product acts as a drier. Adherence to the copper is extremely firm.

I have observed that the condensation product of maleic anhydride and a nonconjugated unsaturated nonhydroxylated drying oil adheres very firmly to wood and leather, doubtless due to the presence of the polar-reactive group. I therefore recommend this product as an improved paint vehicle, or patent leather coating substance.

The suitability of the condensation product of an acyclic olefinic acid having less than ten carbon atoms in its carbon chain with a nonconjugated unsaturated nonhydroxylated fatty oil for priming or base purposes is increased when cellulose derivative lacquers are employed for a subsequent coat or coats, because cellulose derivative solutions, such as nitrocellulose solutions (for example, nitrocellulose dissolved in ethyl alcohol and ethyl acetate), are completely miscible with the condensation product of the present invention, and firm adherence between the condensation product coat and the cellulose derivative coat or coats is thus obtained. It will be understood, however, that the subsequent coats need not be cellulose derivative lacquers, but may comprise other paints or lacquers, such as paints based upon the condensation product of Example 1, or paints based upon commercial drying oils or mixtures of these.

Other cellulose derivatives may be used instead of nitrocellulose for coating upon the condensation product of the present invention. Other cellulose esters such as cellulose acetate may be employed. Cellulose ethers such as ethyl cellulose may be used. Of course these materials will be dissolved in suitable solvents.

The cellulose derivatives may be incorporated with the condensation product of the present invention in coating materials. Nitrocellulose solutions are miscible with the condensation product of Example 1, for instance, in proportions of 20% to 50% of nitrocellulose solution or 80% to 50% of the condensation product of Example 1. The acidic group in the condensation product gives firm adherence to the subject being coated, and very desirable films result. The condensation product of any of the nonconjugated unsaturated nonhydroxylated fatty oils previously discussed may be incorporated with nitrocellulose, though obviously the best results are obtained by using the acidic condensation product of a drying oil, such as the maleic condensation product of linseed oil.

Other cellulose derivatives may be incorporated with the condensation product of the present invention, for example other cellulose esters like cellulose acetate and cellulose ethers like ethyl cellulose, in suitable solvents. Up to 20% of ethyl cellulose may be dissolved in the maleic anhydride condensation product of linseed oil at about 220° C. With cellulose ethers like ethyl cellulose, a reaction occurs resulting in the splitting off of water, the exact mechanism not being understood. Apparently the maleic anhydride group reacts with the ethyl cellulose. The reaction product is desirable as a metal coating, drying to a tough hard film of high gloss, very high transparency and high water resistance.

Very satisfactory oil-soluble driers may be made by causing the acidic condensation product of the present invention, especially the condensation product of a drying oil, to react with a metallic oxide, hydroxide, carbonate or similar compound capable of combination with the acidic group of the condensation product. For example, the oxides, hydroxides and carbonates and acetates in the presence of water, and many other salts of lead, cobalt or manganese can be caused to react with the maleic anhydride condensation product of linseed oil prepared as described in Example 1, to form driers which are readily soluble in linseed oil and in the condensation product and very useful in the paint, varnish and lacquer industry.

A very cheap and easy way to make a drier is to add a small amount of manganese or cobalt oxide or acetate or white lead to the condensation product of Example 1. One-half per cent of lead is usually sufficient. As already explained, where the material is used as a priming coat on a metal which possesses drying properties, for example copper, the acidic group of the condensation product in combining with the metal to be coated forms its own drier and dries quite rapidly, even though the oil used in forming the condensation product is not a rapid drying oil.

In certain instances, it is desirable to esterify or partially esterify the acidic group before applying the coating. The alcohol used may be either aliphatic or aromatic and either mono-, di- or poly-hydric. The esterified condensation product in which the olefinic acid having less than ten carbon atoms is condensed with the grouping of a nonconjugated unsaturated nonhydroxylated fatty drying oil exhibits the same desirable air-drying and thermo-hardening properties as the unesterified condensation product and may be used for paint, varnish and lacquer work with success.

*Example 8*

A typical case of esterification is exhibited when 25 parts by weight of the viscous oil obtained by the interaction of maleic anhydride and linseed oil, as described for instance in Example 1, are mixed with 1.6 parts by weight of ethylene glycol and the mixture is maintained at about 180° C. until the reaction ceases. A 1:1 xylene solution of the reaction product, when treated with a suitable quantity of metallic driers, as described for instance in Example 6, dries at room temperature to a hard film in a somewhat shorter time than that required for linseed oil and, when stoved at 80° C., gives a hard film in about one and one-half hours. The film is not attacked by water, alcohol or xylene.

In the above reaction the ethylene glycol neutralizes the acid anhydride and forms an ester. Of course, if the starting material is the condensation product of linolenic acid instead of its glyceride, esterification takes place at the carboxyl group as well as at the acid anhydride group, as the condensation product is then polar-reactive at two distinct parts of the molecule.

A very desirable property of the condensation product of maleic anhydride or the like with drying oils is that the viscosity is only slightly increased by virtue of the condensation. It is, however, possible to "body" the condensation product of maleic anhydride or the like with a drying oil such as linseed oil, either by blowing or heating or both, either in the presence of a drier or without a drier. Such bodied condensation product may be used in the paint, lacquer and varnish industry, and for related purposes.

*Example 9*

Heat 100 parts by weight of the condensation product of maleic anhydride and linseed oil as obtained in Example 1 to 305° C. and maintain it at this temperature with constant stirring until the viscosity reaches the desired value. The viscosity of the condensation product increases very rapidly at this temperature, and any required viscosity short of the gel stages may be obtained. The reaction period is generally less than one hour.

The condensation product obtained as above may be heated until a one-half inch string pours from cold metal. This condensation product is then cut with an equal weight of raw linseed oil. Seven parts by weight of the mixture is added to a paint containing 225 parts by weight of white lead paste, 40 parts by weight of raw linseed oil and 7 parts by weight of thinner plus drier. The final composition of the paint is 28% pigment by volume, with the vehicle containing 10% thinner by weight. This paint shows greatly improved viscosity, markedly superior pigment suspension and greatly improved levelling properties.

The maleic anhydride condensation product of linseed oil obtained in Example 1 may be blown at 105° C. to produce the same viscosity as that described in Example 9 above, and the blown condensation product may be used in the same general way. The blown-bodied condensation products are superior in color to the heat-bodied condensation products of the present invention.

In accordance with the present invention it is possible to increase tremendously the property of a film or coating of firm adherence to metal and of firm adherence to special lacquer films which are subsequently applied.

I believe that I am the first to discover that olefinic acids and the like having less than ten carbon atoms in their carbon chains will condense with the carbon chain of a non-conjugated unsaturated nonhydroxylated aliphatic acid having from ten to twenty-four carbon atoms in the carbon chain or a nonhydroxylated ester or a non-hydroxylated salt thereof. I frequently refer to such nonconjugated unsaturated nonhydroxylated aliphatic acids, nonhydroxylated esters, nonhydroxylated salts, etc. as nonconjugated unsaturated nonhydroxylated fatty acid compounds, or compounds having the fatty acid grouping.

For different compounds, some variations in the desirable reaction temperatures and pressures will be found.

Throughout the specifications and claims, where I refer to nonconjugated unsaturated nonhydroxylated aliphatic acids having from ten to twenty-four carbon atoms in the carbon chain, or nonhydroxylated salts or nonhydroxylated esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

Where reference is made to poly-hydric alcohols, it is intended to include di-hydric alcohols. Under the designation poly-hydric alcohols, it is intended to include substituted poly-hydric alcohols such as glycol monoethyl ether. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention what I claim as new and desire to secure by Letters Patent is:

1. The process of coating material which will react with an acid, which comprises applying directly to the material to be coated, the condensation product of an acyclic olefinic acid having less than ten carbon atoms in its carbon chain and a nonconjugated unsaturated nonhydroxylated fatty oil having from ten to twenty-four carbon atoms in the carbon chain, heated together at a temperature in excess of 150° C. with continuance of the heating until a substantial quantity of the acyclic olefinic acid is combined at an intermediate point in the carbon chain in the oil.

2. The process of coating, which comprises applying to the object to be coated the condensation product of an acyclic olefinic acid having less than ten carbon atoms in the carbon chain reacting at the carbon chain of a compound including the grouping of a nonconjugated unsaturated nonhydroxylated aliphatic acid having from ten to twenty-four carbon atoms in the carbon chain, heated together at a temperature in excess of 150° C. with continuance of the heating until a substantial quantity of the acyclic olefinic acid is combined at an intermediate point in the carbon chain of the compound including the grouping of a nonconjugated unsaturated nonhydroxylated aliphatic acid, which condensation product has the property of firm adherence to the object, and subsequently applying a cellulose derivative film which has the property of firm adherence to the condensation product.

3. The process of coating, which comprises applying to the object to be coated the condensation product of an acyclic olefinic acid having less than ten carbon atoms in the carbon chain, reacting at the carbon chain of a compound including the grouping of a nonconjugated unsaturated nonhydroxylated aliphatic acid having from ten to twenty-four carbon atoms in the carbon chain, heated together at a temperature in excess of 150° C. with continuance of the heating until a substantial quantity of the acyclic olefinic acid is combined at an intermediate point in the carbon chain of the compound including the grouping of a nonconjugated unsaturated nonhydroxylated aliphatic acid, which condensation product has the property of firm adherence to the object, and subsequently applying a nitrocellulose film which has the property of firm adherence to the condensation product.

4. The process of coating, which comprises applying to the object to be coated a cellulose derivative and the condensation product of an acyclic olefinic acid having less than ten carbon atoms in its carbon chain and a nonconjugated unsaturated nonhydroxylated drying oil having from ten to twenty-four carbon atoms in the carbon chain, heated together at a temperature in excess of 150° C. with continuance of the heating until a substantial quantity of the acyclic olefinic acid is combined at an intermediate point in the carbon chain in the oil and the condensation product having the property of firm adherence to the object to be coated.

5. A coating composition having the property of firm adherence to the object coated, comprising the condensation product of an acyclic olefinic acid having less than ten carbon atoms in the carbon chain with the carbon chain of one of the group consisting of nonconjugated unsaturated nonhydroxylated aliphatic acids having from ten to twenty-four carbon atoms in the carbon chain, nonhydroxylated salts and nonhydroxylated esters thereof, heated together at a temperature in excess of 150° C. with continuance of the heating until a substantial quantity of the acyclic olefinic acid is combined at an intermediate point in the carbon chain of the one of the group, in the proportions of not more than enough of the olefinic acid to saturate all double bonds in the aliphatic acid, salt or ester.

6. A coating composition having the property of firm adherence to the object coated, comprising the condensation product of one of the first group consisting of maleic acid and its anhydride and compounds which yield the same under the conditions of the reaction, at a point of unsaturation in the carbon chain of one of the second group consisting of nonconjugated unsaturated nonhydroxylated aliphatic acids having from ten to twenty-four carbon atoms in the carbon chain, nonhydroxylated salts and nonhydroxylated esters thereof, heated together at a temperature in excess of 150° C. with continuance of the heating until a substantial quantity of the one of the first group is combined at an intermediate point in the carbon chain in the one of the second group, in the proportions of not more than enough of the maleic compound to saturate all double bonds in the aliphatic acid, salt or ester.

7. A coating composition comprising a cellulose derivative and a condensation product of an acyclic olefinic acid having less than ten carbon atoms in its carbon chain, at a double bond in the carbon chain of a nonconjugated unsaturated nonhydroxylated fatty oil having from ten to twenty-four carbon atoms in the carbon chain, heated together at a temperature in excess of 150° C. with continuance of the heating until a substantial quantity of the acyclic olefinic acid is combined at an intermediate point in the carbon chain in the oil.

8. A coating composition comprising a cellulose derivative and a condensation product of an acyclic olefinic acid having less than ten carbon atoms in its carbon chain with a nonconjugated unsaturated nonhydroxylated drying oil having from ten to twenty-four carbon atoms in the carbon chain, heated together at a temperature in excess of 150° C. with continuance of the heating until a substantial quantity of the acyclic olefinic acid is combined at an intermediate point in the carbon chain in the oil.

9. A coating composition comprising a condensation product of an acyclic olefinic acid having less than ten carbon atoms in its carbon chain at a point of unsaturation in the carbon chain of linseed oil in the proportions of not substantially more than enough of the acid to saturate the oil.

10. A coating composition comprising a cellulose derivative and a condensation product of one of the group consisting of maleic acid and its anhydride and compounds which yield the same under the conditions of the reaction, at a point of unsaturation in the carbon chain of a nonconjugated unsaturated nonhydroxylated drying oil having from ten to twenty-four carbon atoms in the carbon chain, heated together at a temperature in excess of 150° C. with continuance of the heating until a substantial quantity of the one of the group is combined at an intermediate point in the carbon chain in the oil.

11. A coating composition comprising an ester of a condensation product of an acyclic olefinic acid having less than ten carbon atoms in its carbon chain, with a nonconjugated unsaturated nonhydroxylated fatty oil having from ten to twenty-four carbon atoms in the carbon chain, heated together at a temperature in excess of 150° C. with continuance of the heating until a substantial quantity of the acyclic olefinic acid is combined at an intermediate point in the carbon chain in the oil.

12. The process of coating material which will react with an acid, which comprises applying directly to the material to be coated, the condensation product of an acyclic olefinic acid having less than ten carbon atoms in its carbon chain and a nonconjugated unsaturated nonhydroxylated fatty oil having from ten to twenty-four carbon atoms in the carbon chain, heated together at a temperature not less than 150° C. and in excess of the ordinary boiling point of the acyclic olefinic acid with return condensation and for a time sufficient to produce a substantial amount of the condensation product, the reaction occurring at a point of unsaturation of the fatty oil.

13. The process of coating material which will react with an acid, which comprises applying directly to the material to be coated, the condensation product of an acyclic olefinic acid having less than ten carbon atoms in the carbon chain and linseed oil, heated together at a temperature not less than 150° C. and in excess of the ordinary boiling point of the acyclic olefinic acid with return condensation and for a time sufficient to produce a substantial amount of the condensation product.

14. The process of coating, which comprises applying to the object to be coated the condensation product of an acyclic olefinic acid having less than ten carbon atoms in the carbon chain at the carbon chain of a nonconjugated unsaturated nonhydroxylated fatty oil having from ten to twenty-four carbon atoms in the carbon chain, heated together at a temperature not less than 150° C. and in excess of the ordinary boiling point of the acyclic olefinic acid with return condensation and for a time sufficient to produce a substantial amount of the condensation product, which condensation product has the property of firm adherence to the object and subsequently applying a cellulose derivative film which has the property of firm adherence to the condensation product.

15. The process of coating, which comprises applying to the object to be coated the condensation product of an acyclic olefinic acid having less than ten carbon atoms in the carbon chain at points of unsaturation of linseed oil, heated together at a temperature not less than 150° C. and in excess of the ordinary boiling point of the acyclic olefinic acid with return condensation and for a time sufficient to produce a substantial amount of the condensation product, which condensation product has the property of firm adherence to the object, and subsequently applying a cellulose derivative film which has the property of firm adherence to the condensation product.

16. The process of coating, which comprises applying to the object to be coated a cellulose derivative and a condensation product of an acyclic olefinic acid having less than ten carbon atoms in its carbon chain and a nonconjugated unsaturated nonhydroxylated oil having from ten to twenty-four carbon atoms in the carbon chain, heated together at a temperature not less than 150° C. and in excess of the ordinary boiling point of the acyclic olefinic acid with return condensation and for a time sufficient to produce a substantial amount of the condensation product, the condensation occurring at a point of unsaturation in the oil.

17. A coating composition having the property of firm adherence to the object coated, comprising the condensation product of an acyclic olefinic acid having less than ten carbon atoms in the carbon chain with the carbon chain of a nonconjugated unsaturated nonhydroxylated oil, heated together at a temperature not less than 150° C. and in excess of the ordinary boiling point of the acyclic olefinic acid with return condensation and for a time sufficient to produce a substantial amount of the condensation product, in the proportions of not more than enough of the olefinic acid to saturate all double bonds in the oil.

18. A coating composition having the property of firm adherence to the object coated, comprising the condensation product of one of the group consisting of maleic acid and its anhydride and compounds which yield the same under the conditions of the reaction, at a point of unsaturation in the carbon chain of a nonconjugated unsaturated nonhydroxylated fatty oil having from ten to twenty-four carbon atoms in the carbon chain, heated together at a temperature not less than 150° C. and in excess of the ordinary boiling point of the one of the group with return condensation and for a time sufficient to produce a substantial amount of the condensation product in the proportions of not more than enough of the maleic compound to saturate all double bonds in the oil.

19. A coating composition having the property of firm adherence to the object coated, comprising the condensation product of one of the group consisting of maleic acid and its anhydride and compounds which yield the same under the conditions of the reaction, at a point of unsaturation in the carbon chain of linseed oil heated together at a temperature not less than 150° C. and in excess of the ordinary boiling point of the one of the group with return condensation and for a time sufficient to produce a substantial amount of the condensation product, in the proportions of not more than enough of the maleic compound to saturate all double bonds in the oil.

20. A coating composition comprising a cellulose derivative and a condensation product of an acyclic olefinic acid having less than ten carbon atoms in its carbon chain at a point of unsaturation in the carbon chain of a fatty oil having from ten to twenty-four carbon atoms in the carbon chain, heated together at a temperature not less than 150° C. and in excess of the ordinary boiling point of the acyclic olefinic acid with return condensation and for a time sufficient to produce a substantial amount of the condensation product.

21. A coating composition comprising a cellulose derivative and a condensation product of an acyclic olefinic acid having less than ten carbon atoms in its carbon chain at a point of unsaturation in the carbon chain of linseed oil, heated together at a temperature not less than 150° C. and in excess of the ordinary boiling point of the acyclic olefinic acid with return condensation and for a time sufficient to produce a substantial amount of the condensation product.

EDWIN T. CLOCKER.

Certificate of Correction

Patent No. 2,188,884. January 30, 1940.

EDWIN T. CLOCKER

It is hereby certified that errors appear in the printed specification of the above numbered patent requiring correction as follows: Page 5, first column, lines 28 to 33, Example 6, in the formula, for

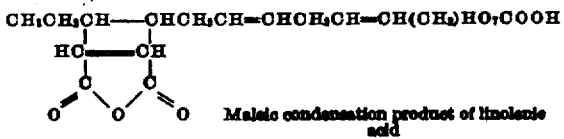

read

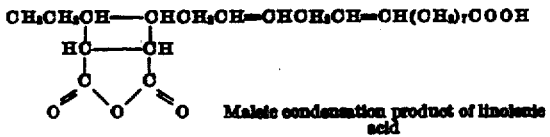

page 7, first column, line 14, after the word "steel" insert a comma; and that the said Letters Patent should be read with these corrections therein that the same may conform to the record of the case in the Patent Office.

Signed and sealed this 23rd day of April, A. D. 1940.

[SEAL]

HENRY VAN ARSDALE,
*Acting Commissioner of Patents.*